United States Patent
Pokrass et al.

(10) Patent No.: US 10,274,594 B2
(45) Date of Patent: Apr. 30, 2019

(54) DIRECT DOPPLER-FREE VELOCITY MEASUREMENT IN LINEAR FREQUENCY MODULATION RADAR

(71) Applicant: GM Global Technology Operations LLC, Detroit, MI (US)

(72) Inventors: Alexander Pokrass, Bat Yam (IL); Igal Bilik, Rehovot (IL); Shahar Villeval, Tel Aviv (IL)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 336 days.

(21) Appl. No.: 15/370,324

(22) Filed: Dec. 6, 2016

(65) Prior Publication Data
US 2018/0156911 A1 Jun. 7, 2018

(51) Int. Cl.
| | | |
|---|---|---|
| *G01S 13/18* | (2006.01) | |
| *G01S 13/64* | (2006.01) | |
| *G01S 13/93* | (2006.01) | |
| *G01S 13/34* | (2006.01) | |
| *G01S 13/58* | (2006.01) | |

(52) U.S. Cl.
CPC .............. *G01S 13/64* (2013.01); *G01S 13/18* (2013.01); *G01S 13/343* (2013.01); *G01S 13/345* (2013.01); *G01S 13/588* (2013.01); *G01S 13/931* (2013.01)

(58) Field of Classification Search
CPC ...... G01S 13/18; G01S 13/343; G01S 13/345; G01S 13/588; G01S 13/64; G01S 13/931
USPC ........................................... 342/105
See application file for complete search history.

(56) References Cited

U.S. PATENT DOCUMENTS

2015/0160335 A1* 6/2015 Lynch .................. G01S 7/2813
342/194

* cited by examiner

*Primary Examiner* — Timothy A Brainard
(74) *Attorney, Agent, or Firm* — Cantor Colburn LLP

(57) ABSTRACT

A method and system to estimate a velocity of a target use a radar to transmit a linear frequency modulated chirp from each of a plurality of transmit elements and receive resulting reflections. The system also includes a processor to process the reflections resulting from a frame of chirps at a time and compute the velocity based on determining a number of the frames of chirps for the target to move a specified distance. The processor processes the reflections by performing a range fast Fourier transform (FFT) such that the specified distance is a range spanned by a range bin and each frame of chirps is one transmission of the chirp by each of the plurality of transmit elements.

10 Claims, 3 Drawing Sheets

DIRECT DOPPLER-FREE VELOCITY MEASUREMENT IN LINEAR FREQUENCY MODULATION RADAR

INTRODUCTION

The subject invention relates to direct Doppler-free velocity measurement in linear frequency modulation (LFM) radar.

Radar systems have wide-ranging use in applications that require target detection and tracking. An LFM radar transmits pulses with frequencies that increase or decrease over time with a specified slope. The transmitted signal can be referred to as a chirp. A LFM radar transmits chirps of a given pulse duration at a given pulse repetition interval. Target velocity can be determined from the Doppler frequency shift that is determined from reflections that result from the transmitted chirps. However, while the maximum resolvable velocity increases as the pulse repetition interval decreases, the Doppler resolution increases as the pulse repetition interval increases. Accordingly, it is desirable to provide an alternate approach to determining target velocity.

SUMMARY

In one exemplary embodiment, a system to estimate a velocity of a target includes a radar to transmit a linear frequency modulated chirp from each of a plurality of transmit elements and receive resulting reflections. The system also includes a processor to process the reflections resulting from a frame of chirps at a time and compute the velocity based on determining a number of the frames of chirps for the target to move a specified distance. The processor processes the reflections by performing a range fast Fourier transform (FFT) such that the specified distance is a range spanned by a range bin and each frame of chirps is one transmission of the chirp by each of the plurality of transmit elements.

In another exemplary embodiment, a method of estimating a velocity of a target includes transmitting a linear frequency modulated chirp from each of a plurality of transmit elements of a radar, and receiving reflections resulting from the chirps at the radar. The method also includes processing, using a processor, the reflections resulting from a frame of chirps at a time to compute the velocity of the target based on determining a number of the frames of the chirps for the target to move a specified distance. The processing the frame of chirps includes performing a range fast Fourier transform (FFT) such that the specified distance is a range spanned by a range bin and each frame of chirps is one transmission of the chirp by each of the plurality of transmit elements.

The above features and advantages and other features and advantages are readily apparent from the following detailed description when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION

Figure 1:
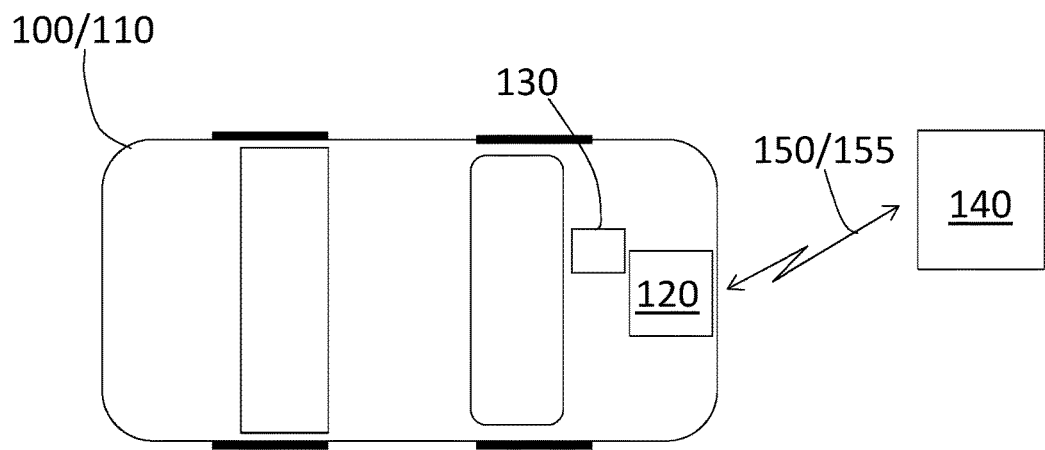
FIG. 1 is a block diagram of a system to obtain target velocity according to one or more embodiments.

The following description is merely exemplary in nature and is not intended to limit the present disclosure, its application or uses. It should be understood that throughout the drawings, corresponding reference numerals indicate like or corresponding parts and features.

As previously noted, target velocity can be determined from the Doppler frequency shift. The Doppler frequency shift is typically measured via the phase difference between transmitted chirps and received reflections. The chirp duration determines the required latency time and maximum radar range which limits the number of chirps that can be transmitted. This, in turn, affects the Doppler resolution for a given maximum range, which affects the maximum velocity that can be resolved. The velocity v is given by:

$$\frac{1}{T_f} \frac{c}{4f_c} \qquad [\text{EQ. 1}]$$

The frame duration ($T_f$) is given by a product of the number of chirps and the chirp duration is the speed of light ($3*10^8$ meters/second) and $f_c$ is the carrier frequency (e.g., $77*10^9$ for automotive radar applications). In the automotive example, $c/4f_c$ would be on the order of $10^{-3}$. The frame duration is inversely proportional to the Doppler frequency resolution. Thus, minimizing the frame duration improves Doppler frequency resolution. However, the frame duration must be at least sufficiently long to accommodate transmission of a chirp by each transmit element.

Embodiments of the methods and systems described herein relate to using the change in range of a target to calculate target velocity. When a chirp transmission increases in frequency over time, for example, each frequency of the chirp corresponds with a target range with increasing frequency corresponding with increasing range. As a result, a chirp transmission can be viewed as a signal that indicates increasing target range over time. That is, the received reflection resulting from a chirp signal can be viewed as energy that is distributed over a set of frequency or corresponding range bins. Each bin represents a spread of the energy originating from a target. The number of bins is defined by the size of the fast Fourier transform (FFT).

For example, if the maximum detectable target range ($R_{max}$) is 100 meters and the number of bins ($N_{range}$ bins) is 128, then the range resolution or the target range change per bin is 0.78 meters (=100/128). By determining a time for a target to move from one range bin to the next, the velocity can be determined as distance (i.e., range per bin) divided by that time. Thus, while EQ. 1 gives the equation for computing velocity as a function of Doppler frequency, velocity can also be computed according to:

$$\frac{1}{T_{frame}} \frac{R_{max}}{N_{range\_bins}} \qquad [\text{EQ. 2}]$$

In the exemplary case of 150 meters $R_{max}$ and 1024 range bins ($N_{range\_bins}$=1024), $R_{max}/N_{range\_bins}$ would be on the order of $10^{-1}$. Thus, compared with the exemplary case of determining velocity based on EQ. 1, EQ. 2 represents a 100 times increase in maximum target velocity. Alternatively, the comparison indicates that $T_{frame}$ can be increased without decreasing the maximum detectable target velocity when EQ. 2 is used. In a multi-input multi-output (MIMO) radar system, this indicates that coding can be implemented on multiple transmit antennas, thereby decreasing the number of chirps transmitted by each.

In accordance with an exemplary embodiment of the invention, FIG. 1 is a block diagram of a system to obtain target velocity. A platform 100 includes a radar system 120 and a controller 130. The exemplary platform 100 shown in FIG. 1 is an automobile 110. In alternate embodiments, the platform 100 can be a different type of vehicle (e.g., farm equipment, automated manufacturing equipment, construction equipment) or a stationary support. The radar system 120 can be a MIMO radar with multiple transmit and receive elements. The transmit and receive antennas can be separate or can be shared in a transceiver arrangement. The radar system 120 transmits chirps 150 and receives reflections 155. As previously noted, the frequency of a received reflection 155 corresponds with a range of the target 140 that resulted in the reflection 155. This correspondence is used to determine target velocity according to one or more embodiments, as detailed below.

The controller 130 can process chirps 150 transmitted by the radar system 120 and reflections 155 received by the radar system 120. The controller 130 can additionally perform other functions of the platform 100. For example, in the automobile 110, the controller 130 can operate or be coupled to steering or braking control. The controller 130 includes processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
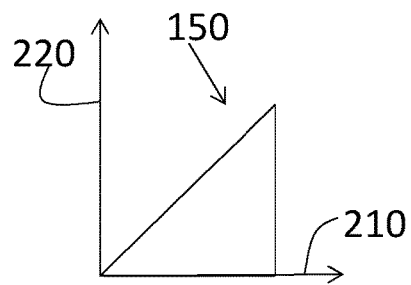
FIG. 2 depicts an exemplary chirp according to one or more embodiments.

FIG. 2 depicts an exemplary chirp 150 according to one or more embodiments. Time is shown increasing along axis 210 and frequency is shown increasing along axis 220. The exemplary chirp 150 in FIG. 2 is an upchirp, because the frequency increases with time at a given slope. In alternate embodiments, the chirp 150 can be a downchirp with decreasing frequency over time. When the chirp 150 is reflected by a target 140, the frequency of the reflection 155 corresponds with the range of the target 140. Thus, just as the reflection 155 can be processed to perform an FFT and determine the energy per frequency bin, the reflection 155 can be processed to determine the energy per corresponding range bin.

Figure 3:
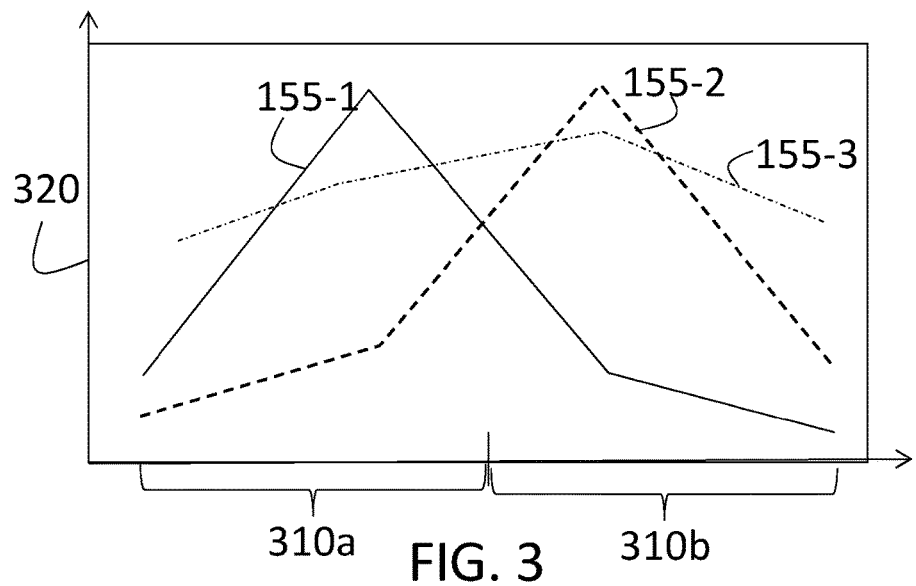
FIG. 3 shows two frequency bins and exemplary energy levels associated with each of the frequency bins for different reflections.

FIG. 3 shows two frequency bins 310a, 310b and exemplary energy levels associated with each of the frequency bins 310a, 310b for different reflections 155. The frequency bin 310a includes frequencies ranging from 1.59 to 1.6 Hertz, and the frequency bin 310b includes frequencies ranging from 1.6 to 1.161 Hertz, for example. The energy level 320 for each frequency bin 310a, 310b is indicated in FIG. 3. For reflection 155-1, the energy level 320 in frequency bin 310a is higher than the energy level 320 in frequency bin 310b. For reflection 155-2, the energy level 320 in frequency bin 310b is higher than the energy level 320 in frequency bin 310a. Every reflections 155 that is received between reflection 155-1 and reflection 155-2 is not shown, but exemplary reflection 155-3 is shown to illustrate that the energy level 320 shifts gradually from one frequency bin 310a to the other frequency bin 310b.

Figure 4:
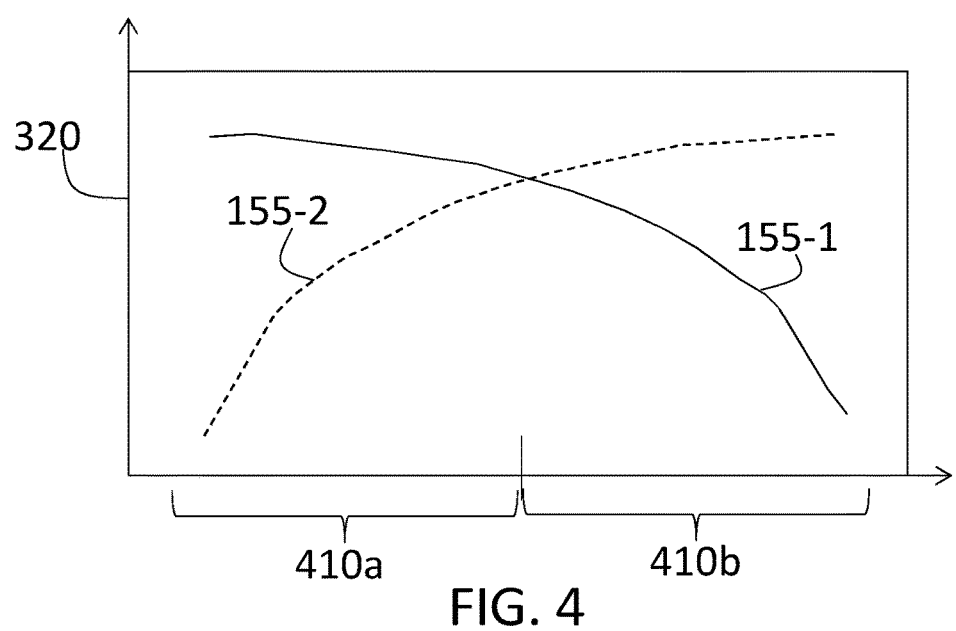
FIG. 4 shows two range bins and exemplary energy levels associated with each of the range bins for two different reflections discussed with reference to FIG. 3.

FIG. 4 shows two range bins 410a, 410b and exemplary energy levels associated with each of the range bins 410a, 410b for two of the reflections 155-1, 155-2 discussed with reference to FIG. 3. The range bin 410a includes ranges 15.01 to 15.06 meters and the range bin 410b includes ranges from 15.06 to 15.11 meters, for example. The range bin 410a corresponds with frequency bin 310a, and the range bin 410b corresponds with frequency bin 310b. As such, the energy level 320 associated with reflection 155-1 is higher in range bin 410a than in range bin 410b, and the energy level 320 associated with reflection 155-2 is higher in range bin 410b than in range bin 410a. Again, the intermediary reflections 155 received between reflection 155-1 and reflection 155-2 are not shown, but the shift in the energy level 320 from range bin 410a to range bin 410b is gradual. This shift and the time it takes, as determined based on the number of range bins to achieve it, are used to determine the velocity of the target 140, as discussed with reference to FIG. 5.

Figure 5:
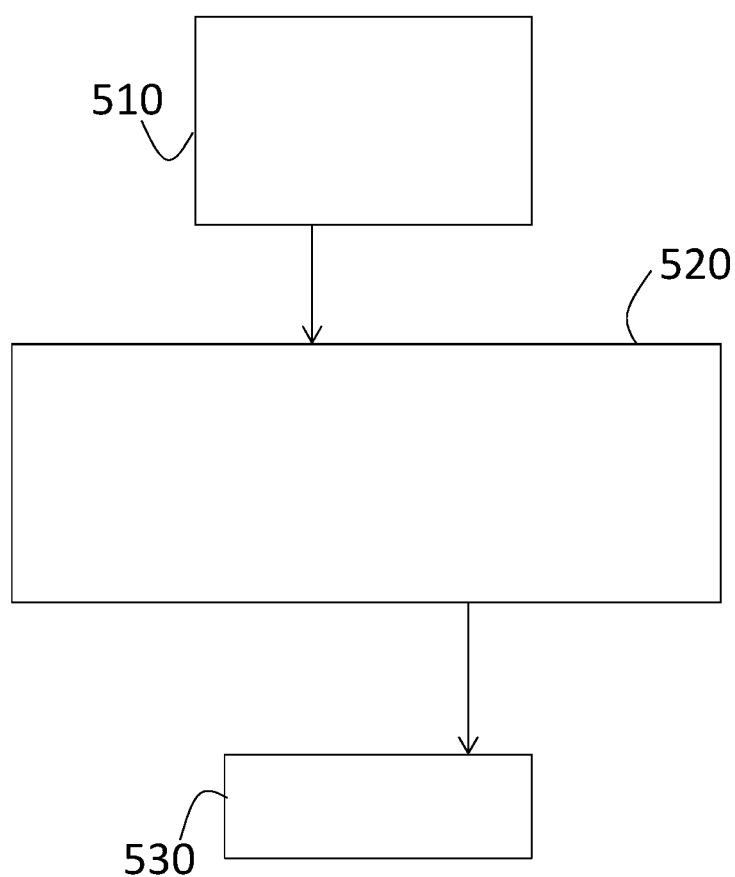
FIG. 5 is a process flow of a method of determining target velocity according to one or more embodiments.

FIG. 5 is a process flow of a method of determining target velocity according to one or more embodiments. At block 510, processing reflections 155 for a frame of chirps 150 at a time includes performing an analog-to-digital (A/D) conversion and a range FFT. The range FFT indicates that energy levels are indicated for each of the range bins 410 rather than the associated frequency bins 310. Determining the number of frames ($N_f$) for movement of the maximum energy level 320 from one range bin 310 to an adjacent range bin 310, at block 520, is based on the processing at block 510. At block 530, the computation of velocity is given by:

$$v = \frac{\Delta R}{N_f T_f} \quad [\text{EQ. 3}]$$

The change in range ($\Delta R$) is the range spanned by one range bin 410, and the number of frames ($N_f$) multiplied by the frame duration ($T_f$) gives the length of time taken for the change in range.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A system to estimate a velocity of a target, the system comprising:
   a radar configured to transmit a linear frequency modulated chirp from each of a plurality of transmit elements and receive resulting reflections; and
   a processor configured to process the reflections resulting from a frame of chirps at a time and compute the velocity based on determining a number of the frames of chirps for the target to move a specified distance, wherein the processor processes the reflections by performing a range fast Fourier transform (FFT) such that the specified distance is a range spanned by a range bin and each frame of chirps is one transmission of the chirp by each of the plurality of transmit elements.

2. The system according to claim 1, wherein the processor processes the reflections by performing an analog-to-digital conversion to sample the reflections prior to performing the range FFT.

3. The system according to claim 1, wherein the range spanned by each range bin is given by a maximum detected range divided by a number of the range bins according to the range FFT.

4. The system according to claim 1, wherein the processor determines the number of the frames of chirps needed for the target to move the specified distance based on tracking an energy level in each of the range bins and determining the number of frames for a maximum energy level to move from one of the range bins to an adjacent one of the range bins.

5. The system according to claim 4, wherein the processor computes the velocity v as:

$$v = \frac{\Delta R}{N_f T_f},$$

where $\Delta R$ is the specified distance, $N_f$ is the number of frames and $T_f$ is a time to transmit the frame of chirps.

6. A method of estimating a velocity of a target, the method comprising:
transmitting a linear frequency modulated chirp from each of a plurality of transmit elements of a radar;
receiving reflections resulting from the chirps at the radar; and
processing, using a processor, the reflections resulting from a frame of chirps at a time to compute the velocity of the target based on determining a number of the frames of the chirps for the target to move a specified distance, wherein the processing the frame of chirps includes performing a range fast Fourier transform (FFT) such that the specified distance is a range spanned by a range bin and each frame of chirps is one transmission of the chirp by each of the plurality of transmit elements.

7. The method according to claim 6, wherein the processing the reflections includes performing an analog-to-digital conversion to sample the reflections prior to the performing the range FFT.

8. The method according to claim 6, further comprising determining the range spanned by each range bin based on a maximum detected range divided by a number of the range bins according to the range FFT.

9. The method according to claim 6, further comprising determining the number of the frames of chirps needed for the target to move the specified distance based on tracking an energy level in each of the range bins and determining the number of frames for a maximum energy level to move from one of the range bins to an adjacent one of the range bins.

10. The method according to claim 9, further comprising computing the velocity v as:

$$v = \frac{\Delta R}{N_f T_f},$$

where
$\Delta R$ is the specified distance, $N_f$ is the number of frames and $T_f$ is a time to transmit the frame of chirps.

* * * * *